United States Patent [19]
Bradic

[11] Patent Number: 5,958,523
[45] Date of Patent: Sep. 28, 1999

[54] COATING AND LUBRICANT COMPOSITIONS CONTAINING POLYFLUORFULLERENES AND METHODS OF USE

[76] Inventor: Marijan Bradic, M. Kiepacha 41, HR-43260 Krizevci, Croatia

[21] Appl. No.: 08/853,482

[22] Filed: May 9, 1997

Related U.S. Application Data

[62] Division of application No. 08/650,828, May 20, 1996, abandoned.

[30] Foreign Application Priority Data

May 19, 1995 [DE] Germany ............................ 195 18 005

[51] Int. Cl.$^6$ ................................................. C10M 131/02
[52] U.S. Cl. ........................ 427/509; 524/495; 524/496; 524/543; 524/544; 524/545; 508/588; 204/157.15; 204/157.42; 204/157.44
[58] Field of Search ..................... 524/496, 495, 524/543, 544, 545; 427/509; 508/588; 204/157.15, 157.42, 157.44

[56] References Cited

U.S. PATENT DOCUMENTS

| | | | |
|---|---|---|---|
| 5,248,498 | 9/1993 | Neumann et al. | 424/9.36 |
| 5,354,926 | 10/1994 | Fagan et al. | 570/129 |
| 5,558,903 | 9/1996 | Bhushan et al. | 427/11 |

FOREIGN PATENT DOCUMENTS

| | | |
|---|---|---|
| 28 30 352 | 1/1980 | Germany . |
| 6-024718-A | 7/1992 | Japan . |
| 6-024720-A | 7/1992 | Japan . |
| 6-024721-A | 7/1992 | Japan . |

OTHER PUBLICATIONS

Holloway, et al., "Fluorination of Buckminsterfullerene", *Chem. Soc. Chem. Commun.* (1991).

Hamwi, et al., Preparation and Characterization of Fluorinated Fullerenes, *Fullerene Science &Technology*, 1(4) (1993).

Hirsch, Andreas, "The Chemistry of the Fullerenes", *Organic Chemistry Monograph Series*, (1993).

*Primary Examiner*—Marion McCamish
*Assistant Examiner*—John J. Guarriello
*Attorney, Agent, or Firm*—Blank Rome Comisky & McCauley LLP

[57] ABSTRACT

The invention relates coating and lubricating compositions comprising polyfluorfullerene and method for using same. The surface to be coated can also be the surface of granulated or powdery polymers. To make polyfluorfullerene a fullerene solution is mixed with a polytetrafluoroethylene dispersion, and the reaction mixture is irradiated with fluorescent light during the mixing time to form polyfluorfullerene. Also, the polyfluorfullerene can be sublimated upon the surface to be coated at about 350° C., or, applied to a surface and sintered at about 400° C., preferably more than 400° C.

Polyfluorfullerene can also be used as additive for a coating of surfaces.

9 Claims, No Drawings

COATING AND LUBRICANT COMPOSITIONS CONTAINING POLYFLUORFULLERENES AND METHODS OF USE

This is a divisional of application Ser. No. 08/650,828, now abandoned, filed May 20, 1996.

BACKGROUND OF THE INVENTION

This invention relates to a process for making polyfluorfullerene and to compositions comprising polyfluorfullerene.

This application is based on German Patent Application File No. 195 18 005.4, whose disclosure is incorporated herein in its entirety.

Polyfluorfullerenes are derived from the fullerenes.

This new substance class consisting of $C_{60}$, $C_{70}$ fullerenes was documented as existing for the first time in 1985 by means of mass spectroscopy investigations (H. W. Kroto, J. R. Heath, S. C. O'Brien, R. F. Curl, R. E. Smalley, Nature 1985, 318, 162) and the first macroscopic quantities were made in 1990 (W. Kräschmer, L. D. Lamb, K. Fostiropoulos, D. R. Huffman, Nature 1990, 347, 354).

Until the present invention, polyfluorfullerenes were obtained from solid fullerene by treating a solution of fullerene in dichloromethane with $XeF_2$ or due to the action of $F_2$ gas at low pressure (D. A. Dizon, N. Matsuzawa, T. Fukunaga, F. N. Tebbe, J. Phys Chem. 1992, 96, 6107, J. H. Holloway, E. G. Hope, R. Taylor, G. L. Langley, A. G. Advent, T. J. Dennis, J. H. Hare, H. W. Kroto, D. M. Walton, J. Chem. Soc. Chem. Commun. 1991, 966; H. Selig, C. Lifshitz, T. Peres, J. E. Fischer, A. R. McGhie, W. J. Romanov, J. P. McCauley Jr., A. B. Smith III, J. Am. Chem. Soc. 1991, 113, 5476).

In the process, polyfluorfullerenes were obtained with a varying degree of fluorination having the empirical formula $C_mF_{2n}$, where m, n are natural numbers with m=60 or 70 and n=15–35, but can vary both below and above the given range. For example, a hyperfluorinated fullerene with n=51 and the general empirical formula $C_{60}F_{102}$ has already been documented by way of mass spectroscopy. Fullerenes with m>70 and the corresponding fluorinated compounds are also possible.

Fullerene Sci. Technol. (1993), 1 (4), 499–535 discloses comprehensive investigation results pertaining to the manufacture of polyfluorfullerene due to the action of $F_2$ gas upon solid fullerene with reaction times, temperature and the $F_2$ being varied. Both pure $C_{60}$ fullerene and a mixture of $C_{60}/C_{70}$ fullerene were used as initial compounds.

With relation to the use of the new substance class of polyfluorfullerenes, Derwent Abstr. No. 94-071 652/09 discloses that in JP 060 24720-A, polyfluorfullerene is made by means of the action of $F_2$ gas on fullerene in the presence of hydrogen fluoride and the resulting polyfluorfullerene is suitable as a lubricant or as additive for lubricants. No other uses of polyfluorfullerenes have been described thus far.

OBJECTS AND SUMMARY OF THE INVENTION

A principal object of the present invention is to provide additional uses of polyfluorfullerenes.

Another object of the present invention is to provide polyfluorfullerenes for the purpose of coating surfaces, especially material surfaces.

Still another object of the present invention is to provide polyfluorfullerene coating compositions and coating methods that result in a temperature-stable and chemically-inert coating that has anti-adhesive properties, somewhat comparable to Teflon®.

Other objects and advantages will become apparent from the description which follows.

Fullerenes and polyfluorfullerenes are sublimateable. Polyfluorfullerene can be sublimated onto the surface to be coated at about 350° C. In this connection, it may be advantageous to keep the temperature of the reaction mixture over 100° C. but below the decomposition temperature of polytetrafluoroethylene to remove the solvent prior to sublimation. Polyfluorfullerenes are preferably made by mixing a fullerene apolar solution with a polytetrafluoroethylene dispersion. The reaction mixture is irradiated during mixing with fluorescent light having a wavelength of from about 380 to 780 nm in the manner described in my concurrently filed application "Process for Making Polyfluorfullerene and Compositions Comprising Same," the entire subject matter of which is incorporated herein by reference. The resulting polyfluorfullerene is sublimated upon the surface to be coated at about 350° C.

In another preferred embodiment, polyfluoroethylene is obtained by mixing fullerene solution in an apolar solvent with a polytetrafluoroethylene dispersion. The reaction mixture is irradiated during the mixing time with fluorescent light having a wavelength in the range from about 380 to 780 nm and that the resultant reaction mixture is applied to the surface to be coated. The coated surface is dried at higher temperature and that the resultant film is sintered on the surface at about 400° C., preferably more than 400° C.

Fluorescent light is used as activation energy because fullerene is photosensitive and in the visible range of the spectrum absorbs from about 200 to 600 nm. Benzene or toluene are preferred as apolar solvents. Other solvents that can also be used include, for example, hexane. Mixtures of at least two suitable solvents can also be used. The mixing time of the fullerene solution with the polytetrafluoroethylene dispersion is at least about 10 minutes.

Polyfluorfullerene can also be used as an additive for a coating composition, in particular, as an additive in polymer-containing compositions. Polymers which have been used for surface coating include polytetrafluoroethylene. Polytetrafluoroethylene is used advantageously since polyfluorfullerene can then be formed in-situ onto the surface to be coated. Thus, fullerene is first applied followed by a polytetrafluoroethylene film. The combination is sintered at a temperature of about 400° C., preferably more than 400° C., resulting in a surface coating of polytetrafluoroethylene that contains polyfluorfullerene. This surface coating serves as a corrosion protector, yields improved protection against mechanical wear and tear and/or acts as an anti-adhesive film. It was found that polyfluorfullerene made by this sintering procedure is more heavily crystallized than polyfluorfullerene that was produced in the liquid reaction mixture by fluorination with polytetrafluoroethylene.

Moreover, if a material surface is coated with polytetrafluoroethylene to which about 6% by weight polyfluorfullerene is added, an improved polytetrafluoroethylene coating is obtained. If a larger quantity of polyfluorfullerene is added, a disadvantageous effect on the Teflon coating may result.

The time span for sintering at a temperature of preferably more than 400° C.—where the fullerene is diffused into the polytetrafluoroethylene layer—can vary and essentially depends on the quality required in the finished polytetrafluoroethylene-additive layer. It was found that fullerene, applied to the surface as a film, is not quantitatively diffused into the polytetrafluoroethylene. A certain portion of fullerene is sublimated. If a fullerene layer that corresponds to an addition of about 6% by weight of fullerene is applied to the polytetrafluoroethylene coated surface, this yields about 2% by weight polyfluorfullerene in the finished coating.

Polyfluorfullerene can also be employed to coat granulated or powdery materials and/or polymers, preferably polyethylene, with particular preference given to high-density polyethylene. The granular polyethylene has a particle size of about 800–1,000 $\mu$m on the average. The polyfluorfullerene can be applied to the surface of granulated polyethylene as a microcrystal layer by means of sublimation. Other additives—especially a stabilizer for organic peroxide—can be included in the material used and/or the polymer.

If additives, especially the stabilizer, are used, then in a particularly preferred embodiment of the invention, the granulated polymer, especially granulated polyethylene (dust polyethylene), can be coated with polyfluorfullerene.

According to the present invention, polyfluorfullerene is added in a powdery or gaseous form to a mixture comprising granulated polyethylene, preferably high-density polyethylene, stabilizer and organic peroxide. The components are mixed at a temperature of at least about 50 to 60° C.

It was found that polyfluorfullerene is dissolved in the stabilizer and is thus quite surprisingly distributed over the surface of the granulated polyethylene in a well-homogenized manner.

To the mixture of high-density polyethylene, stabilizer and peroxide, one preferably adds about 2% by weight of polyfluorfullerene, related to the total weight of polyethylene.

The present invention will be described in greater detail hereinafter with the help of the following examples.

DESCRIPTION OF THE PREFERRED EMBODIMENTS (BEST MODE)

EXAMPLE I
Method of Making Polyfluorfullerene 40 mg fullerene was dissolved in 5 ml of benzene and 2 g dispersed polytetrafluoroethylene was added. The fullerene used for this purpose was produced at the "Ruder Boskovic" Institute in Zagreb where it was procured from Hoechst. The degree of purity of the fullerene procured from Hoechst was 99.9%, according to manufacturer's information. The fullerene which is used can consist of $C_{60}$, $C_{>60}$, $C_{70}$ and $C_{>70}$ as well as mixtures of these fullerenes. The temperature was set at between 30 and 40° C., and the components were mixed by means of ultrasound with stirring, over a period of 10 minutes. In addition, activation energy in the form of fluorescent light was applied while stirring. The emitted radiation is in the visible or near the visible range of the spectrum, roughly in the range from 380 to 780 nm. The reaction vessel used for this fluorination reaction is made of polytetrafluoroethylene.

During the mixing process, a reaction mixture is obtained having a bright to dark yellow color from the white dispersion of the polytetrafluoroethylene and the violet solution of fullerene.

EXAMPLE I(A)
Varying the Mixing Times

The method of Example I was followed except that the mixing time was varied and increased incrementally up to a mixing time of three days.

Compared to the mixing time of 10 minutes of Example I, increasing the mixing time did not change the reaction results. The yield remained essentially constant.

EXAMPLE I(B)
Varying the Fullerene Concentration

The procedure of Example I was followed except that the fullerene concentration was varied. It was determined that up to 2 g of fullerene could be dissolved in 5 ml of benzene. The quantity of dispersed polytetrafluoroethylene was kept constant. The best mixture was achieved when 60 mg of fullerene was used with the same solvent volume of 5 ml and 2 g of dispersed polytetrafluoroethylene.

EXAMPLE I(C)
Varying the Temperature

At first, the procedure of Example I was used. To achieve greater saturation, the reaction mixture was then heated to about 100° C. over a period of up to five days. By achieving greater saturation, it was desired to obtain a higher yield and, then, a higher degree of fluorination in the direction n=30 of the general formula, which would correspond to perfluorinated fullerene. However, when compared to the reaction of Example I, no ascertainable change in the reaction result was observed. In particular, the yield remained essentially constant. Nevertheless, an increased temperature is advantageous for isolating and recovering polyfluorfullerene by means of sublimation—as will be described hereinafter—because,when benzene is used as the solvent, evaporation occurs at the temperature mentioned, and sublimation can readily occur.

EXAMPLE I(D)
Varying the Solvents

The procedure of Examples I(A)–I(C) were followed except that instead of benzene, toluene was used. No ascertainable changes in the reaction behavior were observed compared to benzene.

Generally, any apolar solvent may be used. The more polar a solvent is, the less suitable is it for use in the present invention. Accordingly, solvents such as THF and acetone can still be used whereas, for example, water is unsuitable as a solvent.

Comparative Example I(E)

The procedure of Example I was employed except that instead of using the fullerene solution, a powdery fullerene was used. The temperature was also raised to about 400° C. No conversion to polyfluorfullerene was observed.

EXAMPLE II
Isolating Polyfluorfullerene by Sublimation

After the mixture was made and the reaction occurs in the manner described in Example I, the temperature was raised to permit the solvent to evaporate. The temperature was kept below the decay temperature of polytetrafluoroethylene, i.e., a temperature somewhat over 100° C. The temperature was then raised to about 350° C., and the polyfluorfullerene was sublimated in a protective gas atmosphere.

Alternatively, sublimation can also be carried out in a vacuum. Both sublimation under a protective gas atmosphere and in a vacuum are suitable for essentially preventing the development of byproducts such as oxy-compounds of polyfluorfullerene by at least partial reaction with oxygen.

EXAMPLE III
Isolating Polyflurofullerene by Extraction

The procedure of Example I was employed to form polyflurofullerene. Polyfluorfullerene was then recovered from the reaction mixture by means of extraction using benzene or toluene as the extraction agent. The unreacted polytetrafluoroethylene contained in the reaction mixture is insoluble in benzene, whereas polyfluorfullerene is dissolved in benzene. Other apolar solvents, such as, for example, hexane or mixtures of at least two suitable apolar solvents, can be used. The recovered polyfluorfullerene was analyzed by means of mass spectrometry. It was found that polyfluorfullerene having the general empirical formula $C_mF_{2n}$ was formed where m=60 or 70 and n=20–35.

EXAMPLE IV
Coating Material Surfaces by Sintering

The reaction mixture, obtained according to Example I, is applied to the surface of a material and the solvent is removed by drying at higher temperature. The film thus generated on the material surface is sintered on the material surface at more than 400° C. The material coating that is thus obtained is useful for corrosion protection, protection against mechanical wear and tear and/or as an anti-adhesive film and has a bright yellow color. The coating feels more slippery than graphite and molybdenum lubricants.

EXAMPLE V
Coating Polyethylene by Sublimation

The reaction mixture obtained according to Example I is sublimated under a protective gas atmosphere at about 350° C. The substrate is made of surface of high-density polyethylene that includes a stabilizer (antioxidant) and a cross-linking agent (organic peroxide). The sublimate, upon contacting the cooled surface, forms a microcrystalline layer on the high-density polyethylene. The polyethylene substrate used was white, but the polyfluorfullerene coating, has a yellow coloration.

EXAMPLE VI
Coating Granulated Polyethylene

Granulated high-density polyethylene (so-called dust polyethylene) having on the average a particle diameter of about 800 to 1,000 μm was coated in a first experiment by sublimating the polyfluorfullerene made according to the present invention onto granulated polyethylene to achieve a microcrystalline homogeneous coating.

In other experiments polyfluorfullerene was dissolved at a temperature of about 60° C. in the stabilizer that is regularly added to a high-density polyethylene for use in cross-linking processes. For example, polyfluorfullerene was dissolved in the stabilizer Irganox by CIBA GEIGY at a temperature of about 210° C., whereas it was not dissolved in the organic peroxide that is used with polyethylene. Polyethylene that is cross-linked generally contains a stabilizer and organic peroxide that acts as a radical former.

The granular polyethylene was coated in the following manner. First, the granulated polyethylene is mixed in a commonly used mixer. The stabilizer is added and mixed by turning the mixture at about 100–200 rpm at a temperature of about 60° C. While mixing, organic peroxide is added by means of a dosing pump under a protective gas atmosphere. Nitrogen is preferred as the protective gas. After thorough mixing, we add pressurized gaseous polyfluorfullerene is added. The mixer operates at a preliminary pressure of about 1 bar due to the peroxide. The mixing time can vary from one to two hours depending on the properties of the particular mixer used.

By virtue of the above-mentioned solubility behavior of polyfluorfullerene in the stabilizer, it is, however, also possible to employ solid polyfluorfullerene in powder form, as described under Example II. Powdery polyfluorfullerene is added to the mixer that contains the granulated polyethylene, the stabilizer and the organic peroxide. The temperature in the mixer is kept at about 60° C., and the mixer content is thoroughly mixed. As a result, polyfluorfullerene in the stabilizer is dissolved, and a homogeneous distribution of polyfluorfullerene is provided on the surface of the granulated polyethylene. The choice of the coating method to be used depends on the desired use of the coated granular polyethylene and the mixing quality required for that use.

EXAMPLE VII
In-Situ Production of Surface Coatings of Polytetrafluoroethylene with Added Polyfluorfullerene Fullerene dissolved in benzene or toluene was applied to the surface to be coated. The fullerene concentration is selected so that it will amount to about 6% by weight, related to the total weight of the finished coating. Then the fullerene coated surface was dried and a film of polytetrafluoroethylene applied. The combination was sintered at a temperature of more than about 400° C., to yield a finished coating. The time interval for sintering was varied and essentially depends on the quality requirement that is established for the finished coating. It was found that during sintering, fullerene diffused into the polytetrafluoroethylene to produce polyfluorfullerene in-situ in the polytetrafluoroethylene. A portion of the resultant polyfluorfullerene was sublimated from the coating during sintering so that when 6% by weight of fullerene was initially used, about 2% by weight, polyfluorfullerene was obtained in the finished coating.

It was found that when the surface coating was done with the objective of improving the polytetrafluoroethylene properties as regards mechanical abrasion resistance, the portion of polyfluorfullerene in the finished coating should not exceed 6%, because a larger portion would disadvantageously alter the structure of the polytetrafluoroethylene.

Although certain presently preferred embodiments of the present invention have been specifically described herein, it would be apparent to those skilled in the art to which the invention pertains that variations and modifications of the various embodiments shown and described herein maybe made without departing from the spirit and scope of the invention. Accordingly, it is intended that the invention be limited only to the extent required by the appended claims and the applicable rules of law.

What is claimed is:

1. A method of coating a substrate comprising the steps of:
   mixing a fullerene solution with polytetrafluroethylene;
   forming polyfluorfullerene; and
   applying polyfluorfullerene to a substrate to be coated.

2. The method of claim 1, wherein said fullerene solution comprises an apolar solvent and said polytetrafluoroethylene is a dispersion.

3. The method of claim 1, further including the steps of heating said mixture and subliminating said polyfluorfullerene onto said substrate.

4. The method of claim 3, wherein said sublimation is carried out at about 350° C.

5. The method of claim 1, further including the steps of applying said solution to a substrate to be coated, evaporating said solvent, and heating the film formed on said substrate at a temperature sufficient to sinter said film to produce in-situ a polytetrafluoroethylene coating that contains polyfluorfullerene.

6. The method of claim 5, wherein the step of heating is carried out at about 400° C. or more.

7. The method of claim 5, wherein said polyethylene substrate includes a stabilizer and organic peroxide.

8. The method of claim 1, wherein said substrate comprises polyethylene.

9. The method of claim 1, further including the step of irradiatiing the mixture with fluorescent light.

* * * * *